United States Patent [19]

Puster et al.

[11] 3,819,113

[45] June 25, 1974

[54] FLUID CONTROL SYSTEM AND METHOD OF OPERATING THE SAME

[75] Inventors: Louis M. Puster, Knoxville; Jay L. Lewis; Harold G. Brakebill, both of Concord, all of Tenn.

[73] Assignee: Robertshaw Controls Company, Richmond, Va.

[22] Filed: Nov. 20, 1972

[21] Appl. No.: 308,181

[52] U.S. Cl. .................... 236/1 C, 236/47, 165/26, 137/85

[51] Int. Cl. .................... G05d 23/275, G05b 11/50

[58] Field of Search .......... 236/47, 1 C; 165/26, 27; 137/85

[56] References Cited

UNITED STATES PATENTS

| | | | |
|---|---|---|---|
| 3,140,047 | 7/1964 | Holloway | 165/27 X |
| 3,305,172 | 2/1967 | Duchek et al. | 236/1 C |
| 3,575,190 | 4/1971 | Puster | 137/85 |

*Primary Examiner*—William E. Wayner
*Attorney, Agent, or Firm*—Candor, Candor & Tassone

[57] ABSTRACT

A fluid control system having a fluid supply means and a fluid operated device. A branch chamber of a fluid operated relay is interconnected by a movable valve means with the exhaust chamber thereof or with the main chamber thereof in response to fluid conditions existing in the pilot chamber thereof. The fluid supply means is interconnected to the main chamber and to the pilot chamber. The fluid operated device is interconnected to the branch chamber. A condition responsive fluid bleed device is interconnected to the pilot chamber whereby the condition responsive fluid bleed device effectively bleeds the pilot chamber of the fluid being supplied thereto from the fluid supply means in response to conditions being sensed thereby so that the fluid being supplied the fluid operated device from the branch chamber is varied in relation to the conditions being sensed by the condition responsive fluid bleed device.

10 Claims, 6 Drawing Figures

FLUID CONTROL SYSTEM AND METHOD OF OPERATING THE SAME

This invention relates to an improved fluid control system as well as to an improved method of operating such a control system or the like.

It is well known that pneumatic control systems can be provided for operating a pneumatically operated device in response to conditions being sensed. For example, a pneumatically operated heat exchanger means can be operated by a pneumatic control system which will supply fluid pressure to the control means for the heat exchanger means in relation to the output temperature effect of the heat exchanger means being sensed by a pneumatically operated temperature sensing device.

Such pneumatic control systems are disclosed schematically in the U.S. Patent to Kreuter et al., U.S. Pat. No. 3,575,343, with the operating components of such control systems being adapted to be contained within a self-contained, small sized, wall thermostat structure through a unique packaging thereof as fully set forth in the U.S. Pat. to Berleyoung et al., No. 3,433,413.

It is a feature of this invention to provide a penumatic control system similar to that set forth in the aforementioned United States patents except that the pneumatically operated comparator of such systems is not utilized by the present system as this invention provides a pneumatically operated relay means controlling the pneumatically operated device by the branch pressure of the relay means, the relay means of this invention having its pilot chamber controlled by a condition responsive fluid bleed means.

In particular, one embodiment of this invention provides a fluid control system having a fluid supply means and a fluid operated device. A condition responsive fluid bleed means and a fluid operated relay means are also provided, the relay means having pilot, exhaust, branch, and main chambers together with valve means for interconnecting the branch chamber with the exhaust chamber or with the main chamber in response to fluid conditions in the pilot chamber thereof, Means are provided for interconnecting the fluid supply means to the main chamber and to the pilot chamber, the fluid operated device to the branch chamber, and the condition responsive fluid bleed means to the pilot chamber whereby the condition responsive fluid bleed means effectively bleeds the pilot chamber of the fluid being supplied thereto from the fluid supply means in response to conditions being sensed thereby so that the fluid being supplied to the fluid operated device from the branch chamber is varied in relation to the conditions being sensed. Such a system can have the fluid supply means thereof adapted to provide two different pressure levels of fluid whereby the fluid operated device is operated in a different manner when the different fluid pressure levels are respectively utilized in the system. For example, one pressure level of fluid can operate a fluid operated heat exchanger means during the heating cycle thereof and the other level of fluid pressure can operate the heat exchanger means during a cooling cycle thereof, the system of this invention automatically switching back and forth between the heating or cooling operation through the sensing of the pressure of the particular pressure level of fluid being supplied thereto.

Accordingly, it is an object of this invention to provide an improved fluid control system having one or more of the novel features set forth above or hereinafter shown or described.

Another object of this invention is to provide an improved method of operating such a fluid control system or the like.

Other objects, uses, and advantages of this invention are apparent from a reading of this description which proceeds with reference to the accompanying drawings forming a part thereof and wherein.

Figure 1:
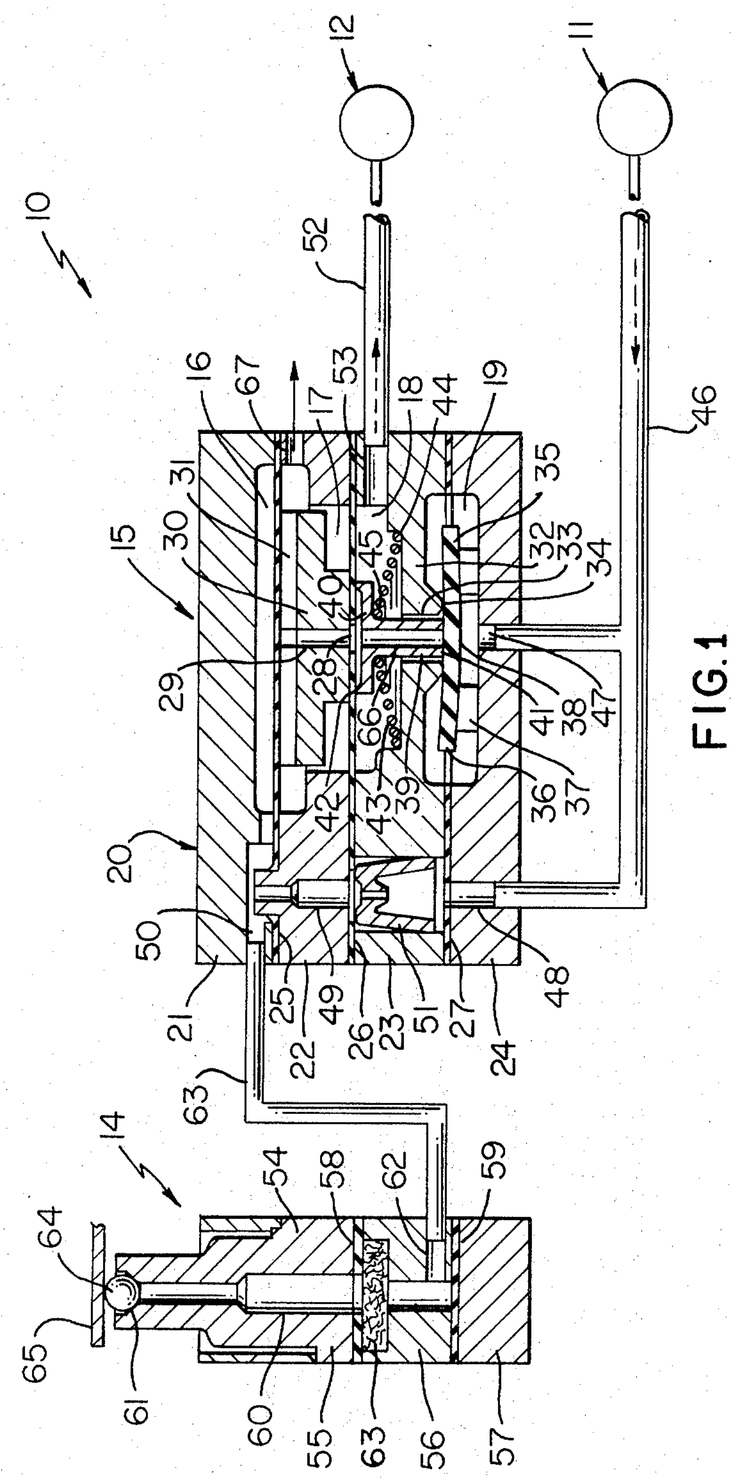
FIG. 1 is a schematic view illustrating one fluid control system of this invention.

While the various features of this invention are hereinafter described and illustrated as being particularly adapted to provide a control system for a pneumatically operated heat exchanger means, it is to be understood that various features of this invention can be utilized singly or in any combination thereof to provide control means for other pneumatically operated devices as desired.

Therefore, this invention is not to be limited to only the embodiments illustrated in the drawings, because the drawings are merely utilized to illustrate one of the wide variety of uses of this invention.

Referring now to FIG. 1, one embodiment of the improved fluid control system is generally indicated by the reference numeral 10 and comprises a fluid supply means 11, a fluid operated device 12, a condition responsive fluid bleed means 14, and a fluid operated relay means 15 having a pilot chamber 16, an exhaust chamber 17, a branch chamber 18, and a main chamber 19.

The relay means 15 is a direct acting relay means which means as the fluid pressure in the pilot chamber 16 increases, the fluid pressure in the branch chamber 18 will likewise increase whereas, conversely, as the fluid pressure in the pilot chamber 16 decreases, the fluid pressure in the branch chamber 18 correspondingly decreases.

The relay means 15 is of the type disclosed and claimed in the U.S. Pat. to Puster et al., No. 3,575,190, with certain improvements being made therein which do not form any of the features of this invention, but do form features of another patent application of Louis M. Puster that is assigned to the same assignee to whom this present application is assigned whereby only the details of the relay means 16 will be described to understand the features of the present invention with the understanding that for further information of the same, reference can be made to the aforementioned U.S. Pat. No. 3,575,190.

In particular, the direct acting relay means 15 comprises a housing means 20 formed from a plurality of housing plates 21, 22, 23 and 24 suitably secured together with sealing gasket means 25 disposed between the housing plates 21 and 22, sealing gasket means 26 disposed between the housing plates 22 and 23, and sealing gasket means 27 disposed between housing plates 23 and 24. The gasket means 25 cooperates with the housing plates 20 and 22 to define the pilot chamber 16 and exhaust chamber 17 on opposite sides thereof whereby the gasket means 25 also provides a flexible diaphragm means separating the pilot chamber 16 from the exhaust chamber 17. Similarly, the gasket means 26 forms a flexible diaphragm means between the exhaust chamber 17 and the branch chamber 18 except that the diaphragm means 26 has an opening 28 passing therethrough and aligned with an opening 29 passing through a spacer member 30 disposed between the diaphragm members 25 and 26 and having cross passages 31 therein always interconnecting the passage 29 and, thus, the opening 28 of the diaphragm 26 with the exhaust chamber 17.

The housing plate 23 has a wall 32 that separates the branch chamber 18 from the main chamber 19 and is provided with an opening 33 passing therethrough which defines a valve seat 34 projecting into the main chamber 19. A flexible valve member or disc 35 is disposed in the main chamber 19 and has its outer peripheral portion 36 supported on a plurality of upwardly directed embossments or extensions 37 formed on the housing plate 24 so as to cause the central portion 38 of the valve member 35 to be slightly bowed downwardly while being held in sealed relation against the valve seat 34 to normally close the valve seat 34 from the main chamber 19 and, thus, the main chamber 19 from the branch chamber 18.

A movable valve member 39 is disposed in the branch chamber 18 and has opposed ends 40 and 41 respectively adapted to be disposed in engagement with the diaphragm 26 outboard of the opening 28 thereof and with the central part 38 of the valve disc 35. The end 40 of the valve member 39 has an annular valve seat 42 thereon which surrounds the opening 28 of the diaphragm 26 and the end 41 of the valve member 39 is adapted to project through the opening 33 in the wall 32 of the plate 23 to engage against the central part 38 of the valve member 35. The valve member 39 has an opening 66 passing therethrough in aligned relation with the opening 28 of the diaphragm 26 and is adapted to be closed at the end 41 by the central part 38 of the valve member 35 when disposed thereagainst in the manner illustrated in FIG. 1. A compression spring 43 is disposed in the branch chamber 18 and has one end 44 thereof bearing against the wall 32 while the other end 45 bears against the valve member 39 to tend to maintain the end 40 thereof in engagement with the diaphragm 26 at all times as will be apparent hereinafter as the diaphragm 26 is moved relative to the housing means 20.

The fluid supply means 11 is adapted to be interconnected by a conduit means 46 to an opening 47 formed in the housing plate 24 and leading to the main chamber 19, and conduit means 46 also being interconnected to an opening 48 formed in the plate 24 and leading to a passage means 49 passing through the housing means 20 in such a manner that the same leads to a cross passage means 50 that is fluidly interconnected to the pilot chamber 16. The passage means 49 has a restrictor means 51 therein for a purpose hereinafter described.

The branch chamber 18 is adapted to be interconnected to a pneumatically operated device 12 by a conduit means 52 that is interconnected to an opening 53 in the plate 23 that leads to the branch chamber 18.

The pneumatically operated device 12 can comprise a "pressure-to-close" valve means for operating a fluid flow through a heat exchanger coil means such that when heated water is being supplied, the next exchanger means 12 is part of a heating unit that will increase its output heating effect as the branch pressure being supplied thereto from the branch chamber 18 decreases in pressure value to cause the valve means 12 to open to a greater degree and, conversely, will decrease the output heating effect as the branch pressure increases in pressure value to cause the valve means 12 to close to a greater degree.

The condition responsive fluid bleed means 14 comprises a housing means 54 formed of a plurality of housing plates 55, 56, and 57 suitably secured together in any suitable manner with gasket means 58 and 59 therebetween, the housing means 54 having a passage means 60 formed therein and interconnecting with a frusto-conical valve seat 61 at one end thereof which leads to the atmosphere and to a passage 62 formed at the other end thereof and leading to conduit means 63 that is adapted to be interconnected to the passage 50 of the relay means 15 in the manner illustrated in FIG. 1. The passage means 60 has a suitable filter 63 disposed therein for filtering any fluid movement through the passage means 60.

A ball valve member 64 is disposed in the frustoconical valve seat 61 and is held in the same by a bimetal member 65 that has its right-hand end adjustably fixed to the housing means 54 in any suitable manner so that the left-hand end is cantilevered and contacts the ball valve 64 while being adapted to warp toward and away from the valve seat 61 in accordance with the temperature being sensed thereby. For example, when the heat exchanger means 12 is a heat producing heat exchanger means and has its output temperature effect decreased as the branch being supplied thereto from the branch chamber 18 increases, the bimetal member 65 is so constructed and arranged that the same is direct acting in a manner to warp downwardly toward the valve seat 61 as the output temperature effect sensed thereby increases to thereby decrease the amount of bleed through the ball valve means 64, 61 as the output temperature effect of the heater means 12 increases.

The operation of the control system 10 will now be described.

As previously stated, it will be assumed that the heat exchanger means 12 will have its output temperature effect decreased as the fluid pressure being supplied thereto from the branch chamber 18 increases and the bimetal member 65 tends to warp downwardly against the ball valve 64 with a greater force as the same senses increasing temperature and with a lesser force as the bimetal member 65 senses a decreasing temperature from a set temperature setting thereof.

It can be seen that the fluid supply means 11 is adapted to supply fluid pressure to the main chamber 19 as well as through the restrictor 51 to the pilot chamber 16 whereby as the fluid pressure in the pilot chamber 16 builds up, the same also acts in the passage means 60 of the condition responsive fluid bleed means 14 to tend to open the ball valve member 64 away from the valve seat 61 and, thus, bleed the fluid pressure in the pilot chamber 16 to the atmosphere. However, opening movement of the valve member 64 is opposed by the spring force of the bimetal member 65 such that the spring force of the bimetal member 65 urging the ball valve 64 against the valve seat 61 decreases as the temperature sensed by the bimetal member 65 decreases from the set temperature thereof and, conversely, the spring force of the bimetal member 65 increases to hold the valve member 64 against the valve seat 61 as the temperature of the bimetal valve member 65 increases from the set temperature thereof. Thus there is adapted to be more fluid bleeding through the ball valve 64, 61 as the temperature decreases and less fluid bleeding as the temperature increases.

As the pressure of the fluid in the pilot chamber 16 increases, the same acts downwardly on the diaphragm 25, and through the separator member 30, on the diaphragm 26 and, thus, on the valve member 39 to urge the same downwardly against the natural bias of the valve disc 35 to tend to open the central portion 38 of the valve disc 35 from the valve seat 34 and, thus, interconnect the main chamber 19 with the branch chamber 18 to thereby increase the pressure value of the pressure fluid in the branch chamber 18. Conversely, as the pressure in the pilot chamber 16 decreases, the pressure in the branch chamber 18 acting upwardly on the diaphragm 26 moves the diaphragm 26 upwardly and since the spring 43 is holding the valve member 39 against the diaphragm 26, the valve member 39 moves upwardly in unison therewith to permit the valve disc 35 to be disposed against the valve seat 34 and, thus, disconnect the main chamber 19 from the branch chamber 18. Further upward movement of the diaphragm 26 causes the valve member 39 to move the end 41 thereof away from the valve disc 35 so as to open the end 41 of the valve member 39 and permit the fluid pressure in the branch chamber 18 to exhaust through the opening 66 of the valve member 39, opening 28 of the diaphragm 26 and passages 29 and 31 of the separating member 30 to pass out to the atmosphere through an opening 67 formed in the housing plate 22 and leading from the exhaust chamber 17 to the atmosphere.

Thus, should the heating effect produced by the heat exchanging means 12 at the level of the particular setting of the bimetal member 65, the relay means 15 will assume the satisfied position illustrated in FIG. 1 wherein both the exhaust chamber 17 and main chamber 19 are disconnected from the branch chamber 18 and with the branch chamber 18 providing its output branch signal at a pressure level to maintain the heat exchanger means 12 at the particular operating condition thereof because the pressure in the pilot chamber 16 remains at a pressure level to maintain the relay means 15 in the satisfied condition illustrated in FIG. 1 as the condition responsive fluid bleed means 14 is bleeding the chamber 16 at a rate that is constantly being resupplied by the supply means 11 through the restrictor means 51.

However, should the output temperature effect of the heat exchanger means 12 fall below the desired output temperature effect setting of the bimetal means 65, the bimetal means 65 will warp upwardly and thereby increase the amount of bleed through the valve seat 61 so that the fluid pressure in the pilot chamber 16 will decrease as the fluid pressure therein will not be replaced at a sufficiently rapid rate through the restrictor means 51 whereby the force of the pressure fluid in the branch chamber 18 will act upwardly on the diaphragm 26 and move the diaphragm 26 upwardly, and, thus, open the end 41 of the valve member 39 to interconnect the branch chamber 18 to the exhaust chamber 17. Thus, the pressure in the branch chamber 18 is decreased to cause the heat exchanger means 12 to increase its output temperature effect until the bimetal member 65 again senses that the output temperature effect is now correct and maintains the ball valve member 64 in a manner to bleed the chamber 16 at a rate to maintain the relay means 15 in the satisfied condition illustrated in FIG. 1.

Conversely, should the output temperature effect of the heat exchanger means 12 increase beyond the set output temperature effect of the bimetal member 65, the bimetal member 65 warps downwardly and, thus, decreases the amount of fluid bleed through the valve seat 61 whereby the fluid pressure in the pilot chamber 16 correspondingly increases. the increase in fluid pressure in the pilot chamber 16 moves the diaphragms 25 and 26 downwardly and through the valve member 39 moves the central portion 38 of the valve disc 35 away from the valve seat 34 to permit main pressure from the chamber 19 to enter into the branch chamber 18 through now opened valve seat 34 and, thus, increase the force of the pressure in the branch chamber 18. This increase in the force in the pressure value of the fluid in the branch chamber 18 causes the heat exchanger means 12 to decrease its output temperature effect so that the bimetal member 65 will eventually decrease in temperature thereof and thereby warp upwardly so that the ball valve member 64 will again bleed the pilot chamber 16 in such a manner that the relay means 15 will again return to the satisfied condition illustrated in FIG. 1 whereby the heat exchanger means 12 will produce the necessary output effect to maintain the bimetal member 65 in the satisfied condition illustrated in FIG. 1.

Therefore, it can be seen that the control system 10 of this invention operates in such a manner that the pilot chamber 16 thereof has its fluid pressure bled in accordance with the condition being sensed by the condition responsive means 14 to operate the pneumatically operated device 12 in relation to the particular pressure value existing in the pilot chamber 16.

Should it be desired to utilize the system 10 for operating the heat exchanger means 12 as a cooling unit when chilled water is supplied through the "pressure-to-close" valve means 12 to the heat exchanger coil means so that the resulting cooling unit has its output cooling effect increase upon a decrease in the branch pressure being directed thereto and have its output cooling effect decreased upon an increase in the branch pressure being directed thereto, the bimetal member 65 of the fluid bleed means 14 is merely turned over on the housing means 54 so that the same will tend to warp upwardly as the same increases in temperature and warp downwardly as the same decreases in temperature. Thus, more fluid pressure is bled from the pilot chamber 16 by the fluid bleed means 14 as the output temperature effect of the heat exchanger increases from the temperature setting of the bimetal member 65 and less fluid pressure is bled from the pilot chamber 16 as the output temperature effect of the heat exchanger means 12 decreases from the temperature setting of the bimetal member 65.

Thus, when the output cooling effect provided by the heat exchanger means 12 is satisfying the set temperature condition of the bimetal member 65, the relay means 14 is in the satisfied condition illustrated in FIG. 1. However, upon an increase in temperature being sensed by the bimetal member 65 over the desired temperature setting thereof, the bimetal member 65 warps upwardly to thereby increase the amount of bleed through the valve seat 61 and thereby decrease the pressure value in the pilot chamber 16. Thus, the diaphragm means 25 and 26 move upwardly to cause the valve member 39 to open its end 41 away from the valve disc 35 so that the pressure in the branch chamber 18 will be exhausted to the exhaust chamber 17 and thereby decrease the value of the pressure signal being directed to the heat exchanger means 12 to thereby cause the heat exchanger means 12 to increase its output cooling effect. Conversely, should the output cooling effect of the heat exchanger means 12 be below the temperature setting for the bimetal member 65, the bimetal member 65 warps downwardly to decrease the amount of bleed through the valve seat 61 and thereby permit the pressure valve in the pilot chamber 16 to increase to cause the valve member 39 to move downwardly and open the valve disc 35 away from the valve seat 34 to interconnect the main chamber 19 with the branch chamber 18. In this manner, an increase in the pressure value in the branch chamber 18 causes the heat exchanger means 12 to reduce its output cooling effect so that the bimetal member 65 will tend to return to the satisfied condition illustrated in FIG. 1 to maintain the valve means 15 in the satisfied condition illustrated in FIG. 1.

Therefore, it can be seen that the control system 10 of this invention is adapted to operate either as a heating or cooling heat exchanger means and, of course, the fluid operated device 12 could be a "pressure-to-open" valve means so as to have its output heating or cooling temperature effect increase upon an increase in pressure thereto rather than upon a decrease in pressure thereto as previously described for a "pressure-to-close" valve means.

Figure 2:
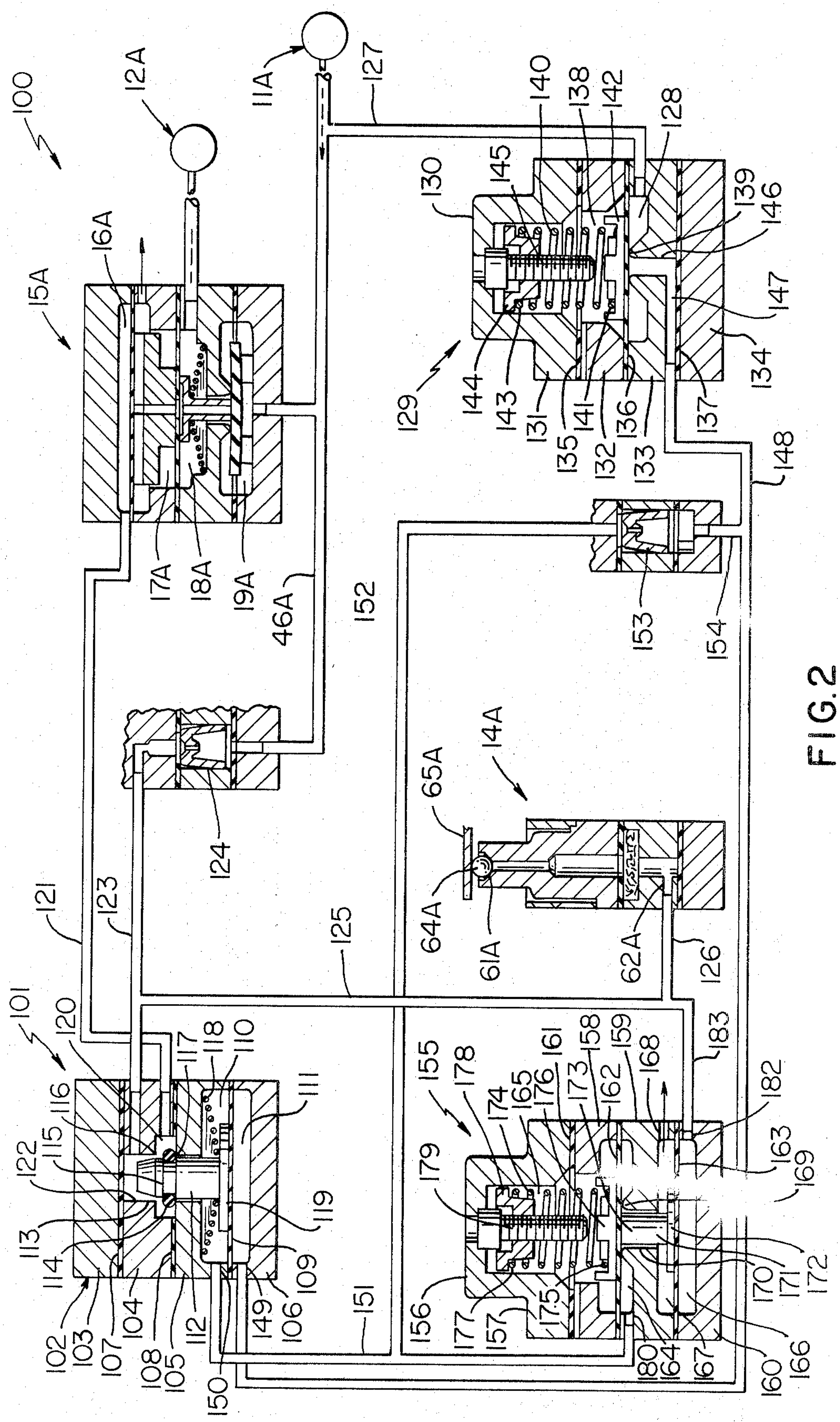
FIG. 2 is a schematic view similar to FIG. 1 and illustrates another fluid control system of this invention.
Figure 3:
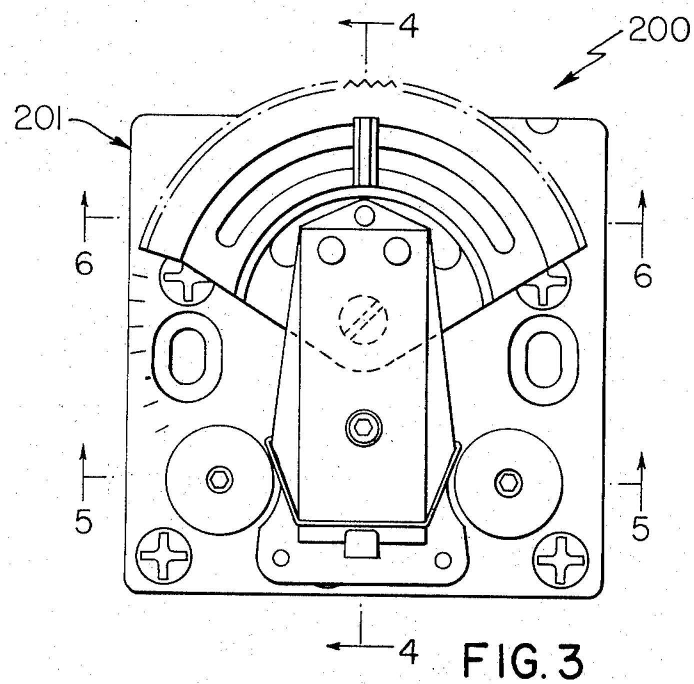
FIG. 3 is a front view of a small wall pneumatic thermostat incorporating therein part of the system of FIG. 2.

Referring now to FIG. 2, another improved fluid control system of this invention is generally indicated by the reference numeral 100 and parts thereof similar to the control system 10 previously described are indicated by like reference numerals followed by the reference letter "A."

As illustrated in FIG. 2, the fluid control system 100 includes the fluid supply means 11A, fluid operated device 12A, condition responsive fluid bleed means 14A, and fluid operated relay means 15A all constructed in the manner previously described but interconnected together in a manner now to be described.

The control system 100 includes a switching valve 101 having a housing means 102 formed of a plurality of housing plates 103, 104, 105 and 106 disposed in stacked relation with gasket means 107 and 108 and 109 being disposed therebetween, the gasket means 109 also providing a diaphragm means separating two chambers 110 and 111 formed in the housing means 102 from each other. A valve member 112 is loosely disposed in an internal passage means 113 formed in the housing means 102 and carries an O-ring 114 in an annular groove 115 formed therein to respectively cooperate with upper and lower valve seats 117 and 116 formed on the housing plates 104 and 105 at the passage means 113. A compression spring 118 bears against a button member 119 of the valve member 112 to normally tend to maintain the O-ring 114 thereof against the valve seat 117 and, thus, prevent fluid communication between the chamber 110 and the valve seat 116 through the passage means 113.

An annular space 120 is defined between the valve seats 116 and 117 in the switching valve 101 and is interconnected by a conduit means 121 to the pilot chamber 16A of the relay means 15A. The valve seat 116 is adapted to interconnect the annular space 120 of the switching valve 101 to a passage means 122 that is interconnected to a conduit 123 that has a restrictor means 124 disposed therein, the restrictor means 124 interconnecting the conduit 123 with the conduit 46A that interconnects the fluid supply means 11A with the main chamber 19A of the relay 15A whereby the restrictor means 124 performs the same function as the restrictor means 51 of the relay means 15 previously described as will be apparent hereinafter.

Thus, as long as the switching valve 101 is in the condition illustrated in FIG. 2 so that the valve seat 117 is closed by the valve member 112 and the valve seat 116 is, thus, being maintained open by the valve member 112, the fluid supply means 11A is interconnected through the restrictor 124 and opened valve seat 116 to the conduit 121 and, thus, to the pilot chamber 16A.

The conduit 123 intermediate the restrictor means 124 and the switching valve 101 is interconnected by a conduit 125 to a branch conduit 126 leading to the inlet port 62A of the condition responsive fluid bleed 14A so that the condition responsive fluid bleed means 14A is adapted to bleed the pilot chamber 16A in response to the condition being sensed by the bimetal member 65A to operate the relay means 15A in exactly the manner previously described for the system 10 when the switching valve 101 is in the position illustrated in FIG. 2 except that the bimetal member 65A is reverse acting, i.e., as the temperature sensed by the bimetal member 65A increases, the bimetal member 65A warps away from the ball valve 64A so as to cause the pressure value in the pilot chamber 16A to decrease and as the sensed temperature decreases, the fluid bleed means 14A causes the pressure valve in the pilot chamber 16A to increase.

The control system 100 is so constructed and arranged that the fluid supply means 11A is adapted to supply two separate fluid pressure levels of fluid, such as, 15 psi for reverse acting of the control system 100 and 25 psi for direct acting of the system 100.

For example, when the heat exchanger 12A is to be operating on a heating cycle thereof and the valve means 12A is a "pressure-to-open" valve means, the system 100 is supplied the low pressure level of supply fluid whereby the switching valve 101 of the valve member 112 is maintained in the down position illustrated in FIG. 2 so that the relay means 15A operates in the manner previously described for the system 10 in operating the heat exchanger means 12A during the heating cycle thereon except that as the output temperature effect of the heating means increases from the set temperature effect of the bimetal member 65A, the branch pressure in the branch chamber 18A decreases to cause a decrease in the output temperature effect of the heat exchanger means 12 and as the output temperature effect decreases below the set temperature of the bimetal member 65A, the branch pressure is increased to cause an increase in the output temperature effect of the heat exchanger means 12.

Thus, as the temperature sensed by the bimetal member 65A goes up, the same warps away from the ball valve member 64A to cause the fluid bleed means 14A to bleed pressure from the pilot chamber 16A to the atmosphere so that the relay means 15A will decrease the pressure in the branch chamber 18A to thus decrease the output temperature effect of the heat exchanger 12A. Conversely, should the output temperature effect of the heat exchanger means 12A decrease, the bimetal member 65A moves the ball valve member 64A closer to the valve seat 61A and thereby increases the pressure in the pilot chamber 16A so that the pressure in the branch chamber 18A will be correspondingly increased and thereby cause the heat exchanger means 12A to increase its output temperature effect.

Accordingly, it can be seen that the control system 100 operates in exactly the same manner as the control system 10 previously described as long as the switching valve has the valve member 112 closing the valve seat 117 and maintaining open the valve seat 116, such position of the switching valve 101 only being provided when the fluid supply means 11A is directing the low pressure level of fluid into the system 100 as will be apparent hereinafter. Thus, the operation of the system 101 when the low pressure level of fluid is utilized need not be further set forth as the same is understood from the previous description of the operation of the system 10.

The main conduit 46A leading from the fluid supply means 11A is interconnected to a branch conduit 127 that leads to a chamber 128 of a snap acting fluid operated valve means that is generally indicated by the reference numeral 129.

The snap acting fluid operated valve means 129 comprises a housing means 130 formed from a plurality of housing plates 131, 132, 133 and 134 with suitable gasket means 135, 136 and 137 therebetween with gasket means 136 also defining a flexible diaphragm separating the chamber 128 from an atmospheric chamber 138 formed in the housing means 130. The housing member 133 is provided with a valve seat 139 that projects into the chamber 128 and is normally closed by the diaphragm 136 under the urging of a compression spring 140 having one end 141 thereof bearing against a backup member 142 of the diaphragm 136 and the other end 143 thereof bearing against a spring retainer 144 threadedly mounted on a threaded adjusting member 145 of the housing means 130. Thus, the force of the compression spring 140 tending to urge the diaphragm 136 in its closing engagement against the valve seat 139 can be adjusted by the adjusting member 145. The force of the compression spring 140 is such that when the low pressure level of the fluid supply means 11A is being directed into the system 110, the diaphragm 136 maintains the valve seat 139 completely closed so that the switching valve 101 will remain in the position illustrated in FIG. 2.

However, when the fluid supply means 11A is switched over to direct the high pressure level of fluid into the conduit 46A, such high pressure level of fluid being directed by the conduit 127 into the chamber 128 acts against the underside of the diaphragm 136 in opposition to the force of the compression spring 140 to urge the same upwardly and open the valve seat 139. As the diaphragm 136 begins to open the relatively large annular valve seat 139, the effective surface area of the diaphragm 136 being influenced by the fluid pressure in the chamber 128 almost immediately increases to a larger more effective area to cause the diaphragm 136 to snap open from the valve seat 139 and, thus, interconnect the chamber 139 with the passage 146 leading from the valve seat 139 to a cross passage 147 in the housing plate 133 to a conduit means 148. This snap opening effect of the diaphragm 136 prevents any adverse oscillating in the opening movement thereof.

The conduit 148 leads to an opening 149 in the housing plate 106 of the switching valve 101, the opening 149 leading to the chamber 111. Thus, when the snap acting valve means 129 opens the valve seat 139 upon the supply means 11A directing the high pressure level of fluid into the system 100, such pressure fluid is now directed into the chamber 111 to act upwardly on the diaphragm 109 in FIG. 2 and readily overcomes the force of the compression spring 118 to drive the valve member 112 upwardly to open the valve seat 117 and close the valve seat 116 until the fluid pressure in the chamber 111 is released by the fluid supply means 11A being switched back to the low pressure level thereof as will be apparent hereinafter.

Thus, it can be seen that once the fluid supply means 11A interconnects the high pressure level of fluid into the system 100, the snap acting valve means 129 opens its valve seat 139 to cause the switching valve means 101 to switch from the position illustrated in FIG. 2 to a position where the valve seat 116 is closed and the valve seat 117 is open so that no longer is the fluid supply means 11A interconnected to the pilot chamber 16A through the valve seat 116.

However, the pilot chamber 16A of the relay means 15A is supplied fluid pressure from the source 11A through the opened valve seat 117 of the switching valve 101 in a manner now to be described.

The chamber 110 of the switching valve 101 is interconnected by an opening 150 in the housing plate 105 to a conduit 151 which is interconnected by a branch conduit 152 to a restrictor means 153, the restrictor means 153 interconnecting the conduit 152 to a branch conduit 154 that leads to the main conduit 148 so that when the high pressure level of fluid is interconnected into the system 100, the high pressure level of fluid is interconnected through the opened valve means 129, conduit 148, branch conduit 154, restrictor means 153, branch conduit 152, conduit 151, chamber 110 and the opened valve seat 117 of the switching valve 101 to thus, the conduit 121 that leads to the pilot chamber 16A.

The condition responsive fluid bleed means 14A is adapted to effectively cause bleeding of the pilot chamber 16A of the relay means 15A through the use of a reversing relay means that is generally indicated by the reference numeral 155 in FIG. 2 when the fluid supply means 11A is supplying the high pressure level of fluid into the system 100.

The reversing relay means 155 comprises a housing means 156 formed of a plurality of housing plates 157, 158, 159 and 160 having gasket means 161, 162 and 163 disposed therebetween, the gasket means 162 and 163 also providing flexible diaphragms. The flexible diaphragm 162 separates a chamber 164 in the housing plate 159 from the atmosphere chamber 165 formed in the housing means 156 and the diaphragm 163 separates a chamber 166 from an exhaust chamber 167 formed in the housing plate 159 and being interconnected to the atmosphere through an exhaust port 168. The housing plate 159 was a valve seat 169 projecting into the chamber 164 to be opened and closed by the diaphragm means 162 with the valve seat 169 having a passage 170 therethrough for leading to the exhaust chamber 167. A stem member or separator 171 is disposed in the exhaust chamber 167 and has a bottom end 172 bearing against the diaphragm 163 while an upper end 173 thereof projects loosely through the opening 170 of the housing plate 159 and the valve seat 169 to engage against the diaphragm 162 as illustrated.

A compression spring 174 is disposed in the atmospheric chamber 165 of the reversing relay means 155 and has one end 175 thereof bearing against a backup plate 176 for the diaphragm 162 and the other end 177 thereof bearing against a spring retainer 178 threadedly mounted on a threaded adjusting member 179 carried by the housing means 156. Thus, the force of the compression spring 174 tending to maintain the diaphragm means 182 in its closed position against the valve seat 169 can be adjusted by the adjusting member 179 in a manner well known in the art.

The chamber 164 of the reversing relay means 155 is interconnected by a port 180 to the conduit 151 whereby the chamber 164 of the reversing relay means 155 is interconnected to the chamber 110 of the switching valve means 101.

The chamber 166 of the reversing relay means 155 is interconnected by a port 182 to a conduit 183 that leads to the branch conduit 126 of the condition responsive fluid bleed means 14A whereby the condition responsive fluid bleed means 14A controls the pressure valve of the fluid in the chamber 166 that is adapted to be supplied fluid pressfre from he source 11A as the conduit 183 is also interconnected to the conduit 125.

The operation of the system 100 will now be described.

As previously stated, when the heat exchanger means 12A comprises a "pressure-to-open" valve means a heating and cooling exchanger means and the heating cycle thereof is desired to be operated, the operator utilizes the fluid supply means 11A to direct the low pressure level of fluid into the system 100 so that the switching valve 101 is in the position illustrated in FIG. 2 whereby the condition responsive fluid bleed means 14A controls the fluid pressure in the pilot chamber 16A by effectively bleeding the pressure in the pilot chamber 16A directly out through the valve seat 61A thereof in the same manner as provided for the system previously described.

However, when the system 100 is to be utilized on a cooling cycle of the heat exchanger means 12A, the operator utilizes the fluid supply means 11A to direct the high pressure level of fluid into the system 100 whereby the condition responsive fluid bleed means 14A will cause bleeding of the pressure in the pilot chamber 16A through the reversing relay means 155 as the bleed through the valve seat 61A of the condition responsive fluid bleed means 14A is for the purpose of bleeding the chamber 166 of the reversing relay means 155 and the valve seat 169 of the reversing realy means 155 directly bleeds the pilot chamber 16A of the relay means 15A in relation to the bleeding of the chamber 166 thereof by the condition responsive fluid bleed means 14A.

In particular, when the high pressure level of fluid is directed into the conduit 46A by the supply means 11A, the same opens the diaphragm 136 of the snap acting valve means 129 in the manner previously described so that the high level of pressure fluid is directed to the chamber 111 of the switching valve 101 to cause the valve member 112 to move upwardly to close the valve seat 116 and open the valve seat 117 whereby the conduit 123 is no longer interconnected to the pilot chamber 16A of the relay means 15A. However, the fluid pressure in the conduit 46A does pass through the restrictor 124 and through the branch conduits 123 and 125 to the conduits 126 and 183 respectively leading to the fluid bleed means 14A and chamber 166 of the reversing relay means 155. The fluid pressure now being supplied into the conduit 148 from the open valve seat 139 of the snap acting fluid operated valve means 129 now passes through the restrictor 153 and conduits 152 and 151 respectively to the chambers 110 and 164 of the switching valve 101 and the reversig relay 155. The fluid pressure being supplied into the chamber 110 of the switching valve 101 is interconnected through the opened valve seat 117 to the conduit 121 and, thus, to the pilot chamber 16A of the relay 15A. Since this pressure in the chamber 110 is also interconnected to the chamber 164 of the reversing relay 155 which has its valve seat 169 open and closed by the diaphragm member 162 which is normally urged to its closed position by the compression spring 174, pressure now in the chamber 166 and acting on the diaphragm 163 and through the separator 171 opens the diaphragm 162 away from the valve seat 169 to bleed the chamber 164 and, thus, the pilot chamber 16A of the relay means 15A.

Thus, should the cooling output temperature effect of the heat exchanger means 12A satisfy the temperature setting of the bimetal member 65A so that the same causes the ball valve member 64A to cause a bleeding through the valve seat 61A thereof at such a rate that the fluid pressure being supplied to the chamber 166 through the restrictor 124 maintains the diaphragm 162 to bleed fluid through the valve seat 169 at such a rate that the replacement of the pressure fluid being supplied thereto through the restrictor means 153 causes the fluid pressure of the pilot chamber 16A of the relay 15A to maintain the relay means 15A in the satisfied condition illustrated in FIG. 2, the cooling output temperature effect of the heat exchanger 12A remains constant as the fluid pressure in the branch chamber 18A remains constant in the manner previously described.

However, should the temperature being sensed by the bimetal member 65A increase over the setting thereof, the bimetal member 65A warps away from the valve member 64A to increase the bleed of fluid through the valve seat 61A and, thus, decrease the force of the pressure fluid in the chamber 166 of the reversing relay 155 and thereby cause less bleeding through the valve seat 169 so that the fluid pressure in the chamber 110 now increases and, thus, now increases in the pilot chamber 16A to cause a corresponding increase in the branch pressure chamber 18A by connecting the main chamber 19A to the branch chamber 18A in the manner previously described for the system 10. This increase in the pressure in the branch chamber 18A causes the heat exchanger means 12A on its cooling cycle to increase its cooling effect to tend to cause the bimetal member 65A to again sense the lower desired temperature.

Should the bimetal member 65A sense a lower output temperature effect than the temperature setting effect thereof, the same moves the valve member 64A downwardly with a greater force so that the bleed through the valve seat 61A is decreased and, thus, causes an increase in the pressure in the chamber 166 of the reversing relay 155. This increase in the fluid pressure in the chamber 166 of the reversing relay 155 causes a greater bleeding of the chamber 164 thereof to the exhaust chamber 167 and, thus, a lowering of pressure in the pilot chamber 16A of the relay 15A. A decrease in the pressure in the pilot chamber 16A causes a lowering of pressure in the branch chamber 18A by having the branch chamber 18A interconnected to the exhaust chamber 17A as previously described for the system 10 whereby the decrease in branch pressure causes the heat exchanger 12A on its cooling cycle to decrease its cooling effect and thereby tend to cause the bimetal member 65A to again sense the set temperature in the manner previously described.

Therefore, it can be seen that the control system 100 of this invention is adapted to cause the switching valve 101 to switch the control system 100 from a reverse acting arrangement of the condition responsive fluid bleed means 14A to a direct acting arrangement when the fluid pressure in the system 100 is increased from a low pressure level of fluid thereof to a high pressure level of fluid thereof. However, in either situation, the condition responsive fluid bleed means 14A directly or indirectly affects the bleeding of the pilot chamber 16A in response to the condition being sensed by the condition responsive fluid bleed means 14A to control the fluid operated device 12A interconnected to the branch chamber 18A of the relay 15A.

When the system 100 has been operating with the high pressure level of fluid to control the heat exchanger means 12A during a cooling cycle of operation thereof, the operator can readily switch the system 100 back to the low pressure level of fluid to control the heat exchanger means 12A in the heating mode thereof by merely causing the fluid supply means 11A to now supply only the low pressure level of fluid into the conduit 46A. When this happens, the lower pressure level of fluid is now directed to the chamber 128 of the snap acting valve means 129 and the higher pressure previously being therein vents not only through the opened valve seat 139, conduit 148, restrictor means 153, conduit 152, conduit 151, and into the chamber 164 to be bled through the vlave seat 169, but also through the conduit 127, conduit 46A, restrictor means 124, conduit 123, conduit 125, and conduit 126 to be bled through the valve seat 61A of the condition responsive fluid bleed means 14A.

Once the pressure in the chamber 128 has dropped to a level where the compression spring 138 can close the diaphragm 136 against the valve seat 139, no more fluid pressure will be directed through the snap acting valve means 129 to the chamber 111 of the switching valve means 101.

Thus, the fluid pressure now trapped in the chamber 111 of the switching valve means is vented to the atmosphere back through the conduit 148, conduit 154, restrictor means 153, conduit 152, conduit 151, and the chamber 164 of the reversing relay means 155 to be bled through the valve seat 169.

Once the fluid pressure in the chamber 111 of the switching valve means 101 has been bled down to a level where the compression spring 118 can move the valve member 112 downwardly to the position illustrated in FIG. 2 to close off the valve seat 117 and again open the valve seat 116, the system 100 is then automatically switched back to a reverse acting system for operating the heat exchanger means 12A in the heating mode thereof because the conduit 123 is now interconnected through the valve seat 116 to the conduit 121 so that the pilot chamber 16A of the relay means 15A is directly under the control of the bleed through the valve seat 61A of the condition responsive fluid bleed means 14A in the manner previously described.

Thus, it can be seen that it is a simple matter to switch the system 100 between the heating cycle of operation and the cooling cycle of operation thereof because it merely requires changing the pressure level of the fluid being delivered hy the supply means 11A into the conduit 46A.

While the control system 100 has been previously described and illustrated as comprising a plurality of separate components interconnected together by conduit means, it is to be understood that some of all of the components illustrated in FIG. 2 could be packaged into one housing means through suitable gasketing of grooved channel plates bolted together or ultrasonically welded together in a manner set forth in aforementioned U.S. Pat. to Berleyoung et al., No. 3,433,413.

For example, reference is now made to FIGS. 3–6 wherein a thermostat unit of this invention is generally indicated by the reference numeral 200 and comprises a housing means 201 formed of a plurality of housing plate means 202, 203, 204 and 205 disposed in stacked and sealed relation and having sealable gasket means 206, 207 and 208 disposed therebetween, the gasket means 206, 207 and 208 also providing diaphragm functions as will be apparent hereinafter.

Figure 4:
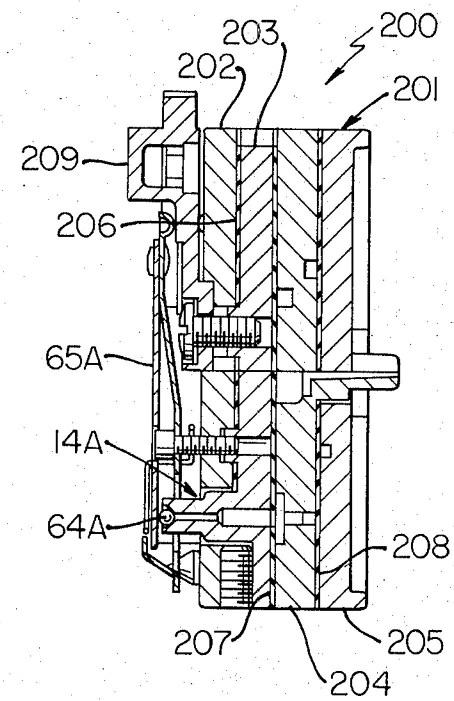
FIG. 4 is a cross-sectional view taken on line 4—4 of FIG. 3.

As illustrated in FIG. 4, it can be seen that the condition responsive fluid bleed means 14A comprises the bimetal member 65A and ball valve member 64A controlled thereby with the bimetal member 65A having its upper end controlled by an adjustable cam member 209 to sense the temperature setting for the bimetal member 65A. However, the details of setting the temperature for such bimetal member 65A do not form a part of this invention as the same form a part of another invention of the co-inventors of this application.

Figure 5:
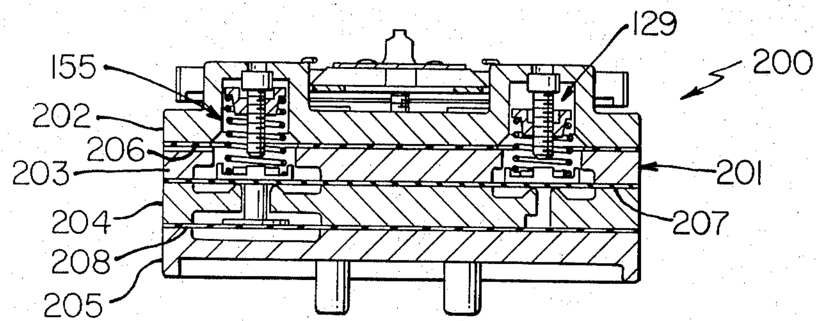
FIG. 5 is a cross-sectional view taken on line 5—5 of FIG. 3.

As illustrated in FIG. 5, the snap acting valve means 129 has the gasket 207 performing the function of the gasket 136 previously described. Also, the unit 200 has the reversing relay means 155 to the left of the snap-acting valve member 129 in FIG. 5 with the diaphragm means 207 and 208 respectively performing the function of the diaphragms 162 and 163 previously described.

Figure 6:
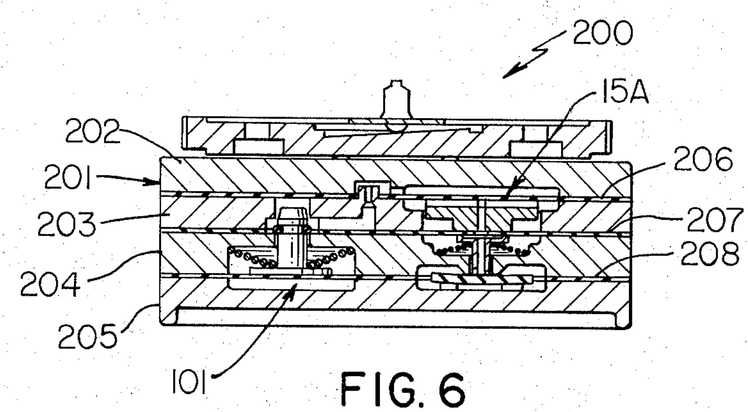
FIG. 6 is a cross-sectional view taken on line 6—6 of FIG. 3.

As illustrated in FIG. 6, the relay means 15A utilizes the diaphragm means 206 and 207 respectively as the diaphragm means 25A and 26A thereof while the switching valve means 101 utilizes the diaphragm means 208 as the diaphragm means 109 previously described.

Thus, it can readily be seen that all of the components illustrated in FIG. 2 can be packaged in or on the housing means 200 through proper channeling of the plates 202, 203, 204 and 205 as well as providing suitable openings through the gaskets 206, 207 and 208 for the fluid interconnections previously described.

Also, it can be seen that by the elimination of various parts in the housing means 200, the housing means 200 can be utilized to provide the control system 10 previously described as the swiching valve 101, snap-acting valve means 129, reversing relay means 155 and restrictor means 153 need not be utilized and the resulting thermostat 200 will provide the control system as illustrated in FIG. 1.

While the systems previously described have utilized fluid under pressure, it is to be understood that subatmospheric fluids can be utilized as desired whereby vacuum or pressure can be utilized to accomplish the same result. Further, while system 14A has been previously described in connection with a "pressure-to-open" valve means 12A whereby a low pressure level of supply fluid operates the system 14A for a heating cycle thereof and a high pressure level of supply fluid operates the system 14A for a cooling cycle thereof, it is to be understood that if it is desired that the valve means 12A be a "pressure-to-close" valve means, then the system 14A would operate on a heating cycle thereof when the high pressure level of supply fluid is supplied to the system 14A and the system 14A would operate on a cooling cycle thereof when the low pressure level of supply fluid is supplied to the system 14A. Thus, by merely selecting the action of operation for the valve means 12A, the valve means 12A could be made either to control cooling at a high pressure level of supply fluid and heating at a low pressure level of supply fluid or cooling at a low pressure level of supply fluid and heating at a high pressure level of supply fluid.

Therefore, it can be seen that this invention not only provides an improved fluid control system, but also this invention provides an improved method of operating a fluid control system or the like.

While the forms and methods of this invention now preferred have been disclosed and described as required by the Patent Statutes, it is to be understood that other forms and methods can be utilized and still come within the scope of the appended claims.

What is claimed is:

1. A fluid control system comprising: a fluid supply means; a fluid operated device; a condition responsive fluid bleed means that has only one vent opening and a single member that controls said vent opening; a fluid operated relay means having pilot, exhaust, branch and main chambers together with valve means for interconnecting said branch chamber with said exhaust chamber or with said main chamber in response to fluid conditions in said pilot chamber thereof; and means interconnecting said fluid supply means to said main chamber and to said pilot chamber, said fluid operated device to said branch chamber, and said condition responsive fluid bleed means to said pilot chamber whereby said condition responsive fluid bleed means effectively bleeds said pilot chamber of said fluid being supplied thereto from said fluid supply means through said vent opening in response to conditions being sensed thereby so that said fluid being supplied said fluid operated device from said branch chamber is varied in relation to said conditions being sensed, said fluid supply means comprising two different pressure levels of fluid whereby said fluid operated device is operated in a different manner when said different pressure levels of fluid are respectively utilized in said system.

2. A fluid control system as set forth in claim 1 and including fluid switching means for causing said condition responsive fluid bleed means to increasingly bleed said pilot chamber through said vent opening as said condition being sensed increases when one pressure level of fluid is interconnected into said system and for causing said condition responsive fluid bleed means to decreasingly bleed said pilot chamber through said vent opening as said condition being sensed increases when the other pressure level of fluid is interconnected into said system.

3. A fluid control system as set forth in claim 7 wherein said means interconnecting said fluid supply means to said pilot chamber includes two restrictor means, said switching means causing said fluid supply means to supply said one pressure level of fluid to said pilot chamber only through one of said restrictor means when said one pressure level of fluid is interconnected into said system and causing said fluid supply means to supply said other pressure level of fluid to said pilot chamber only through the other of said restrictor means when said other pressure level of fluid is interconnected into said system.

4. A fluid control system as set forth in claim 2 wherein said fluid switching means includes a first fluid operated valve means for switching fluid flow paths to said pilot chamber, said fluid switching means including a substantially snap-acting second fluid operated valve means responsive to the pressure level of said fluid supply means to cause operation of said first fluid operated valve means to a different operating condition thereof in accordance with the particular pressure level of fluid being interconnected into said system.

5. A fluid control system as set forth in claim 4 wherein said fluid bleed means includes a fluid operated reversing relay means through which one of said flow paths to said pilot chamber is provided by said first fluid operated valve means when the same is move to one of its operating positions by said second fluid operated valve means, said condition responsive fluid bleed means operating said reversing relay means in response to the condition being sensed thereby when said pilot chamber is supplied fluid through said one flow path by said first fluid operated valve means being in said one operating position thereof.

6. A method of operating a fluid control system comprising the steps of interconnecting a branch chamber of a fluid operated relay means with an exhaust chamber or with a main chamber of said relay means by valve means thereof in response to fluid conditions in a pilot chamber thereof, interconnecting a fluid supply means to said main chamber and to said pilot chamber, interconnecting a fluid operated device to said branch chamber, and bleeding said pilot chamber of said fluid being supplied thereto from said fluid supply means through a vent opening in response to conditions being sensed by a condition responsive fluid bleed means that has only one said vent opening controlled by a single member so that said fluid being supplied said fluid operated device from said branch chamber is varied in relation to said conditions being sensed, said fluid supply means comprising two different pressure levels of fluid whereby said fluid operated device is operated in a different manner when said different pressure levels of fluid are respectively utilized in said system.

7. A method as set forth in claim 6, wherein said step for bleeding said pilot chamber comprises the steps of switching said system with switching means to cause said condition responsive fluid bleed means to increasingly bleed said pilot chamber through said vent opening as said condition being sensed increases when one pressure level of fluid is interconnected into said system and to cause said condition responsive fluid bleed means to decreasingly bleed said pilot chamber through said vent opening as said condition being sensed increases when the other pressure level of fluid is interconnected into said system.

8. A method as set forth in claim 7 wherein said step of interconnecting said fluid supply means to said pilot chamber comprises the step of interconnecting said fluid supply means to said pilot chamber through two restrictor means, said switching step causes said fluid supply means to supply said one pressure level of fluid to said pilot chamber only through one of said restrictor means when said one pressure level of fluid is interconnected into said system and causes said fluid supply means to supply said other pressure level of fluid to said pilot chamber only through the other of said restrictor means when said other pressure level of fluid is interconnected into said system.

9. A method as set forth in claim 7 wherein said fluid switching means includes a first fluid operated valve means for switching fluid flow paths to said pilot chamber, said fluid switching means including a substantially snapacting second fluid operated valve means responsive to the pressure level of said fluid supply means to cause operation of said first fluid operated valve means to a different operating condition thereof in accordance with the particular pressure level of fluid being interconnected into said system.

10. A method as set forth in claim 9 wherein said fluid bleed means includes a fluid operated reversing relay means through which one of said flow paths to said pilot chamber is provided by said first fluid operated valve means when the same is moved to one of its operating positions by said second fluid operated valve means, said condition responsive fluid bleed means operating said reversing relay means in response to the condition being sensed thereby when said pilot chamber is supplied fluid through said one flow path by said first fluid operated valve means being in said one operating position thereof.

* * * * *